US012529249B2

(12) United States Patent
Hunt

(10) Patent No.: US 12,529,249 B2
(45) Date of Patent: Jan. 20, 2026

(54) LOCK FOR A MOTOR VEHICLE

(71) Applicant: Kiekert AG, Heiligenhaus (DE)

(72) Inventor: Robert J. Hunt, Davisburg, MI (US)

(73) Assignee: Kiekert AG, Heiligenhaus (DE)

( * ) Notice: Subject to any disclaimer, the term of this patent is extended or adjusted under 35 U.S.C. 154(b) by 38 days.

(21) Appl. No.: 18/457,571

(22) Filed: Aug. 29, 2023

(65) Prior Publication Data

US 2025/0043601 A1 Feb. 6, 2025

Related U.S. Application Data

(60) Provisional application No. 63/517,161, filed on Aug. 2, 2023.

(51) Int. Cl.
*E05B 85/26* (2014.01)
*E05B 85/24* (2014.01)

(52) U.S. Cl.
CPC ............ *E05B 85/26* (2013.01); *E05B 85/243* (2013.01)

(58) Field of Classification Search
CPC ........ E05B 85/24; E05B 85/243; E05B 85/26; E05B 77/36
See application file for complete search history.

(56) References Cited

U.S. PATENT DOCUMENTS 5,092,639 A * 3/1992 Di Giusto ............... E05B 85/26 292/216
2016/0376817 A1* 12/2016 Strathmann ............. E05B 85/26 292/195
2018/0222294 A1* 8/2018 Cumbo ................. E05B 85/243
2021/0355717 A1* 11/2021 Inan ......................... E05B 85/26
2022/0162889 A1* 5/2022 Linnåsen ................ E05B 85/26

FOREIGN PATENT DOCUMENTS

DE 102019123837 A1 4/2020
DE 102019123825 A1 * 3/2021 ............. E05B 77/40
DE 102021132230 A1 * 6/2023
EP 1500762 B1 * 7/2014 ............. E05B 77/38
GB 2285481 A * 7/1995 ............. E05B 83/40
WO WO-2020083435 A1 * 4/2020 ............. E05B 77/36
WO WO-2021043368 A1 * 3/2021 ............. E05B 77/40
WO WO-2023036364 A1 * 3/2023 ............. E05B 81/06
WO 2023/061529 A1 4/2023

OTHER PUBLICATIONS

Computer Generated Translation for EP 1500762, Generated on May 5, 2025, https://worldwide.espacenet.com/patent/ (Year: 2025).*
International Search Report and Written Opinion mailed Oct. 10, 2024, for International Application No. PCT/US2024/039110.

* cited by examiner

*Primary Examiner* — Alyson M Merlino
(74) *Attorney, Agent, or Firm* — Renner, Otto, Boisselle & Sklar, LLP

(57) ABSTRACT

A lock for a motor vehicle, in particular an electrically actuatable lock, having a locking mechanism with a rotary latch and at least one pawl, wherein the rotary latch can be latched by means of the pawl at least in a main latching position, and having another latching element which is located in the engagement area between the rotary latch and the pawl and is arranged on the rotary latch, wherein the latching element is pivotably accommodated in the rotary latch, and a rolling movement is possible between the latching element and the pawl, wherein the pawl can be brought into engagement with the rotary latch.

10 Claims, 1 Drawing Sheet

LOCK FOR A MOTOR VEHICLE

This application is a Secondary and claims the benefit of U.S. Provisional Patent Application No. 63/517,161, filed Aug. 2, 2023, which is hereby incorporated herein by reference in its entirety.

FIELD OF DISCLOSURE

The invention relates to a lock for a motor vehicle, in particular an electrically actuatable lock, having a locking mechanism with a rotary latch and at least one pawl, wherein the rotary latch can be latched by means of the pawl at least in a main latching position, and having another latching element which is located in the engagement area between the rotary latch and the pawl and is arranged on the rotary latch, wherein the latching element is pivotably accommodated in the rotary latch, and wherein a rolling movement is possible between the latching element and the pawl.

BACKGROUND OF DISCLOSURE

The motor vehicle locks referred to here are generally locks in or on motor vehicles, including, by way of example only, motor vehicle door locks, but also motor vehicle hood locks, motor vehicle tailgate locks, motor vehicle seat locks, load locks, etc. Comfort improvements and noise optimizations are achieved through the latching element arranged in the locking mechanism. This is because any opening and closing operations of the locking mechanism are associated with the two locking mechanism parts rolling against each other or sliding along each other under rolling engagement of the interposed latching element. This is achieved with particularly low noise and force.

In particular, the electrification of motor vehicle locks has brought to the fore low-force, i.e., easy, opening of a locking mechanism. The electric opening of a motor vehicle lock means that the motor vehicle lock can be unlocked at any time by means of the electric drive. The advantage of electric opening is that only a signal needs to be generated to open the side door, for example, in order to activate the electric drive and unlock the lock. An electrical signal can be transmitted to the motor vehicle lock in a variety of ways, such as via a radio remote control, a sensor or a switching means. For example, a door handle can therefore be dispensed with, or the door handle is designed in such a way that only a switching signal is generated which can then be transmitted to the door lock by a control. The electrical unlocking of the locking mechanism can accordingly be used to influence the design and the ease of use of the motor vehicle.

A lock for a motor vehicle equipped with a latching element between the rotary latch and the pawl has become known, for example, from EP 3 870 786 B1. The publication discloses a lock with a locking mechanism with a rotary latch and at least one pawl, wherein the rotary latch can be latched by means of the pawl at least in a main latching position, and with a latching element located in the engagement area between the rotary latch and the pawl and arranged on the rotary latch. The latching element is pivotably accommodated in the rotary latch, wherein the latching element and the pawl are each designed concentric to their bearing points in their engagement area so that a rolling movement between the latching element and the pawl is possible. The aforementioned design enables the locking mechanism to be unlocked easily and accordingly electrically.

In a development of the technology of a use of a latching element, DE 10 2019 123 837 A1 discloses a motor vehicle lock with a locking mechanism consisting substantially of a rotary latch and a pawl and with a latching element arranged in the engagement area between the rotary latch and the pawl, in which the latching element has a guide extension projecting relative to the plane of the locking mechanism for additional axial or radial guidance.

The prior art has proven itself in this respect, but still offers room for supplementary improvements. This is because in the motor vehicle locks provided to date, the latching element is used practically exclusively in conjunction with a main locking position or main latching position of the rotary latch in comparison to the pawl. Often, however, a rotary latch also has a prelatch which is implemented as an additional safeguard, as it were, if the rotary latch does not reach its main latching position during any closing process. The prelatching position is mandatory in parts of motor vehicle locks. If a prelatch is now required with the use of the latching element, the latching element stands in the way of realizing the prelatching position in the immediate vicinity of the main latching position.

This is noteworthy because certain opening gaps of the door element, for example, are required in the prelatching position.

One requirement in connection with a closing drive for a motor vehicle door is that the door element may only have an opening gap in the prelatch that is equal to or smaller than 6 mm. A closing drive is used where, for example, side doors, sliding doors, tailgates, etc. are electrically assisted from a prelatching position to the main latching position. The small gap dimension offers a safety function so that becoming jammed in the door gap is preventable. The problem here is that, on the one hand, a bearing point for the latching element must be realized in the rotary latch and, at the same time, a prelatching position must be realized which, arranged on the rotary latch, allows a small gap dimension in the door in the prelatching position. This is where the invention comes into play.

SUMMARY OF DISCLOSURE

The object of the invention is to provide an improved motor vehicle lock. In particular, the object of the invention is to provide a motor vehicle lock which, on the one hand, allows easy opening and which simultaneously allows a small gap dimension in the prelatching position.

The object is achieved by the features of the claims. Advantageous embodiments of the invention are presented in the dependent claims. It should be noted that the embodiments described below are not restrictive; rather, any variation options of the features described in the description and the dependent claims are possible.

According to the claims, the object of the invention is achieved in that a lock for a motor vehicle, in particular an electrically actuatable lock is provided, having a locking mechanism with a rotary latch and at least one pawl, wherein the rotary latch can be latched by means of the pawl at least in a main latching position, and having another latching element which is located in the engagement area between the rotary latch and the pawl and is arranged on the rotary latch, wherein the latching element is pivotably accommodated in the rotary latch, and wherein a rolling movement is possible between the latching element and the pawl, wherein the pawl can be brought into engagement with the rotary latch. The design of the motor vehicle lock according to the invention makes it possible, on the one hand, to realize a main latching position from the combination of latching element and rotary latch and, on the other hand, to additionally bring the pawl into engagement with the rotary latch. Accordingly, a main latch and, due to the direct engagement of the pawl in the rotary latch, also a prelatch close relative to the main latch can be realized. This offers the particular advantage that small opening gaps can be achieved, for example to enable automated, i.e., electrically assisted, closing of the door or flap element.

When the locking mechanism is closed, the rotary latch engages with a lock holder, wherein the relative movement of the lock holder and rotary latch move the rotary latch into a latching position, for example a main latching position. It is also possible for the rotary latch to be moved into an overtravel position beyond the main latching position so that the pawl can be securely engaged in the rotary latch.

During this closing process, a seal, in particular a door seal, is compressed, which results in a force that is transmitted to the locking mechanism via the lock holder. This closing force must be absorbed by the locking mechanism during operation of the motor vehicle. In extreme situations such as an accident, further extreme loads or forces can act on the locking mechanism. Even in these extreme situations, the locking mechanism must securely fix the lock holder. When the locking mechanism is opened, the aforementioned forces act on the latch, wherein the latching element according to the invention on the rotary latch makes it possible to relieve the locking mechanism by pivoting the locking mechanism parts relative to each other without the locking mechanism parts becoming disengaged. The latching element absorbs the peak loads on the locking mechanism in a rolling or sliding movement by means of the latching element pivotably accommodated in the rotary latch. The rotary or pivoting movement of the latching element accordingly has a relieving effect on the locking mechanism so that, when the pawl and latching element subsequently disengage, there is less force between the locking mechanism components. This makes it possible to achieve an easier as well as quieter unlatching of the locking mechanism.

If the easier unlatching of the locking mechanism relates primarily to the rolling movement or rolling of the locking mechanism element on the pawl or, in this context, the rotary latch as well, the noise can be reduced by the decreased force between the locking mechanism components. If the pawl is released from the rotary latch in a conventional locking mechanism, high forces are applied between the pawl and rotary latch during release. When the pawl is released, there is a so-called opening pop as the locking mechanism is unlatched abruptly. This opening pop can be reduced by the rolling movement of the latching element between the pawl and the rotary latch, since the main load on the locking mechanism due to the rolling movement and the subsequent separation from the pawl takes place at a time when the main load has already been removed from the locking mechanism. Accordingly, if a quieter motor vehicle lock within the meaning of the invention is referenced, this quieter motor vehicle lock is mainly achieved by reducing the tearing noise during the unlocking of the locking mechanism.

As the term "motor vehicle lock" within the meaning of the invention is used, this includes motor vehicle locks that are used, for example, in side doors, sliding doors, flaps, hoods and/or covers, i.e., where pivotably or movably mounted components are arranged in the vehicle. It is also conceivable that the motor vehicle lock is arranged in a backrest of a seat or is used as a floor lock for a removable seat, to name just a few examples of use in a motor vehicle.

The motor vehicle lock has a locking mechanism having a rotary latch, a latching element and at least one pawl. Preferably, at least one pawl is arranged in a plane with the rotary latch and is capable of locking the locking mechanism in a latching position in cooperation with the lock holder, the latching element and the pawl. When the locking mechanism is open, a striker receiver of the rotary latch points in the direction of the lock holder, wherein a relative movement between the lock holder and rotary latch causes the rotary latch to pivot. The pawl is usually spring-biased in the direction of the rotary latch so that the pawl engages with the latching element when a latching position is reached.

A release lever is used to unlock the locking mechanism, wherein the release lever interacts with the locking mechanism and preferably with the pawl in such a way that the locked locking mechanism can be unlocked by the movement of the release lever. The release lever is, for example, pivotally mounted in the motor vehicle lock and is capable of moving at least one pawl out of the engagement area with the rotary latch. Systems with one, two or three pawls are used. It is therefore conceivable, for example, that the pawl is additionally held in engagement with the latching element by another pawl which can then be referred to as a blocking lever. Depending on the torque that arises in the locking mechanism and in the latching position, it can be necessary to block the pawl by a second pawl. In the event in which an opening torque arises in the latch, a second pawl must secure the position of the pawl to ensure reliable closing or holding of the movable element on the motor vehicle.

In an advantageous further embodiment of the invention, the pawl can be brought into engagement with the rotary latch in a bearing area of the latching element. A bearing area is the area in which the latching element moves, or areas in which the latching element comes into contact with the rotary latch. The latching element is pivotally accommodated in the rotary latch so that a rolling movement can be realized in the interaction between the rotary latch, latching element and pawl. The rolling motion is limited by contact surfaces, so that only a predefinable pivoting angle of the latching element can be achieved. The pivoting angle of the latching element results from the interaction of the locking mechanism parts and is designed in such a way that the main load acting on the locking mechanism is dissipated from the locking mechanism by a rolling movement. In the main latch, as well as in a release position of the locking mechanism or the rotary latch when the locking mechanism is in an open state, the latching element is in contact with different areas of the rotary latch. A contact area as well as a bearing point of the latching element is referred to here as the bearing area for the latching element. In an advantageous manner, and in particular to achieve small gap dimensions in the prelatch, the pawl can engage in a bearing area of the latching element in the rotary latch. The direct engagement in the bearing area of the latching element allows the pawl to rest against the latching element itself, on the one hand, and the distance between the main latch and the prelatch to be kept to a minimum, on the other hand. The main latching is accordingly achieved between the latching element and the pawl, whereas the prelatching can be achieved by an engagement between the pawl and the bearing area of the rotary latch.

Furthermore, it can be advantageous and form a design variant of the invention if the bearing area can be formed as an extended contact surface of the bearing point for the latching element. In order to achieve small gap dimensions, it is advantageous that the pawl can assume a locking position at a small distance from the main latch. The latching element itself determines the position of the main latch in the locking mechanism. The latching element as a rolling element requires a bearing point in the rotary latch, which limits at least one arrangement of a latching surface on the rotary latch as an engagement area for the pawl. If the bearing area and, in particular, an extended contact surface of the bearing point for the latching element becomes the latching surface of the pawl, a latching position in the locking mechanism can be achieved with the smallest possible distance between the main latch and the prelatch. In other words, a small gap dimension can be achieved when closing the door in a prelatching position even if the latching element, which requires a bearing point, is used.

If the rotary latch is arranged substantially above an entry area of a lock holder of the motor vehicle lock, this results in another advantageous design variant of the motor vehicle lock. By arranging the rotary latch above an entry area of the lock holder, an additional supporting effect can be achieved by the rotary latch. If the component pivotably arranged on the motor vehicle is no longer able to guide the movable component in a defined position due to damage or aging, the rotary latch can provide additional support for the pivotable component in engagement with the lock holder. The additional supporting force in turn imposes an additional load on the rotary latch, which must be overcome when the locking mechanism is unlocked. In this case as well, the latching element according to the invention, in conjunction with the pawl and proximate prelatch, offers the advantage that the locking mechanism can be easily opened. Easy opening enables the use of an electrically assisted release lever. In other words, the lock can be electrically unlocked by the use of the latching element, even when additional loads are applied to the latch. Additional loads here mean door seal pressures, warped or hanging door elements, accidental damage, etc., precisely in those cases where additional loads act on the locking mechanism and higher forces act on the locking mechanism and must be overcome by the release lever.

It can also be advantageous if the latching element is arranged above the entry area of a lock holder in the motor vehicle lock. By arranging the latching element above the entry area, the interaction between the rotary latch and the latching element or pawl can be brought into an advantageous position. The entry area is subject to weather influences and can be directly exposed to rain or snow, for example. By arranging the latching element in an area above the entry area of the lock holder, the risk of contamination or the influence of environmental influences such as dust is reduced. Consequently, a safe and durable motor vehicle lock is provided by the design according to the invention. If, in an exemplary embodiment, the rotary latch and the latching element are arranged above the entry area of the lock holder, there is the additional advantage that a favorable locking part ratio can be realized in the locking mechanism. The locking part ratio is decisive for the holding and opening forces in the locking mechanism and is defined by the distance between the lock holder, the locking mechanism part axis and the pawl axis.

If the pawl can be brought into engagement with the rotary latch and the latching element in a prelatching position, this again results in an advantageous variant of the invention. By a combined contact of the latching element with the rotary latch and at least partially with the latching element, a safe latching position can be achieved in the prelatching position. In particular, by means of the combined contact, a safe latching in the prelatching position can be realized. On the one hand, force can be transmitted from the pawl to the rotary latch so that a secure hold of the rotary latch is achieved and, on the other hand, additional guidance of the pawl can be achieved by the contact of the pawl with the latching element. The prelatching position can accordingly be additionally secured.

If a bearing point of the rotary latch is arranged substantially behind an end of an engagement area of a lock holder in a lock plate of the motor vehicle lock, another variant of an embodiment of the invention can be provided. The arrangement of the pivot axis or bearing point of the rotary latch behind the entry area of the lock holder can lead to an advantageous configuration of the lock part ratio. In addition, the arrangement of the rotary axis and in particular the arrangement of a rotary axis above the entry area of the lock holder offers the possibility of protecting the rotary axis from environmental influences. Especially with regard to the increased requirements in the motor vehicle and the further increasing requirements on the load of the motor vehicle lock due to increased motor vehicle weights, this can increase the stability of the motor vehicle lock but also the longevity of the motor vehicle lock. On the one hand, the arrangement behind and/or above the entry area can positively influence the lock part ratio and accordingly the forces occurring in the locking mechanism, and on the other hand, this arrangement offers the possibility of protecting the rotary axis from environmental influences.

Furthermore, it may also constitute an embodiment variant of the invention if a rotary axis of the pawl can be arranged substantially behind an end of an entry area of a lock case in a lock plate of the motor vehicle lock. Also, with respect to the arrangement of the pawl, the aforementioned advantages apply, namely the improvement of the locking part ratio, or the better adjustability of the locking part ratio with respect to the requirements in the motor vehicle lock and, moreover, the reduced influence of environmental influences on the rotary axis of the pawl.

If the bearing point of the rotary latch can be formed as an attachment point for the motor vehicle lock, another improvement in the motor vehicle lock can be achieved. By directly forming the pivot point, for example as a bearing bush, the number of components required in the motor vehicle lock can be reduced. In addition, the specifiable tolerances in the motor vehicle lock can be better maintained in a positive manner. The tolerance dimensions in the motor vehicle lock relate primarily to a center point of the lock holder, wherein this center point of the lock holder is referred to as the S-point. Starting from the center point of the lock holder which is engaged with the rotary latch for example in a main latching position, the tolerance dimensions in relation to the motor vehicle lock components are tolerated. If the axis of rotation of the rotary latch is itself a fixing point of the motor vehicle lock, the number of tolerances in the interaction between the lock holder and the locking mechanism is reduced to a minimum. The maintenance of tolerances is accordingly easier. Furthermore, the stability of the motor vehicle lock can additionally be increased because the bearing axle itself is connected to the motor vehicle lock.

It is also advantageous if the locking mechanism components, the rotary latch, latching element, pawl, pawl axle, and rotary latch axle, are formed from a metallic material, at least in the predominantly load-bearing components. The engaged and load-bearing components interact together in such a way that the arising forces, such as may also act on the motor vehicle lock as extreme forces in the event of an accident, are made of a metallic material and in particular of a steel. In addition, the locking mechanism components can have a plastic coating which can preferably be formed as a sheathing on the locking mechanism components and can accordingly positively influence the noise behavior of the motor vehicle lock. In addition, a plastic sheath can also be used, for example, as a guide element for the latching element.

The design of the motor vehicle lock according to the invention allows not only easy opening to be achieved, whereby electrically unlockable locks in particular, so-called e-locks, can be realized, but at the same time positive effects can also be achieved in terms of the durability and robustness of the motor vehicle lock.

BRIEF DESCRIPTION OF DRAWINGS

In the following, the invention is explained in more detail with reference to the accompanying drawings by means of a preferred example of an embodiment. However, the principle applies that the exemplary embodiment does not limit the invention, but merely represents an advantageous embodiment.

In the figures.

DETAILED DESCRIPTION

Figure 1:
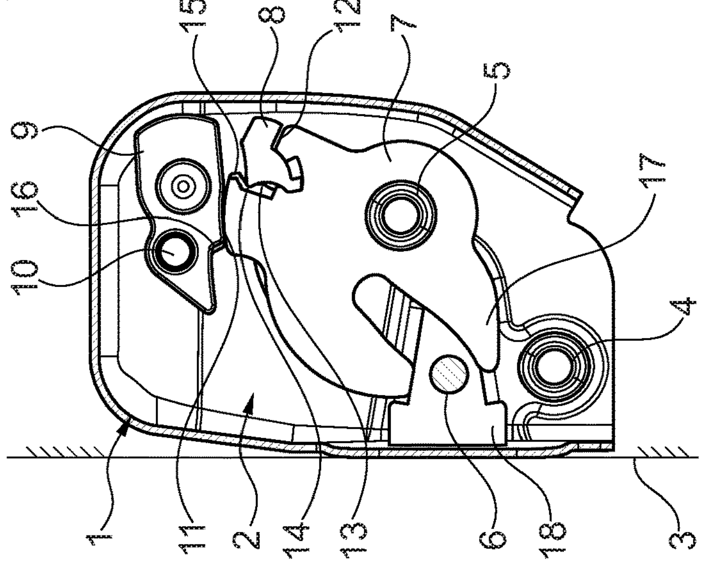
FIG. 1 shows a plan view of a locking mechanism designed according to the invention which is arranged in a lock case of a motor vehicle lock, in which an open position of the locking mechanism is shown, FIG. 2 in turn shows a plan view of a locking mechanism according to the invention according to FIG. 1, in which the locking mechanism is shown in a prelatching position.

FIG. 1 shows a motor vehicle lock 1 in a plan view of a locking mechanism 2, wherein the motor vehicle lock 1 is mounted in a body 3, for example of a vehicle door 3. The motor vehicle lock 1 is screwed to the body 3 via a threaded bushing 4, 5 with an internal thread. In so doing, the motor vehicle lock 1 can be moved relative to a lock holder 6. FIG. 1 shows the open locking mechanism 2 which corresponds, for example, to an open side door or a tailgate. Lock holder 6 and locking mechanism 2 are disengaged in the shown embodiment.

The locking mechanism 2 comprises a rotary latch 7, a latching element 8 and a pawl 9. The pawl 9 has an actuating pin 10, wherein the actuating pin 10 can, for example, be contacted with a release lever and accordingly be moved with the pawl 9. The pawl 9 is spring-biased in the direction of the rotary latch and rests against an outer surface of the rotary latch. The latching element 8 also lies against a surface 12 of the rotary latch and can be spring-biased against the surface 12. Furthermore, a bearing area 13 can be seen on the rotary latch, wherein the bearing area 13 additionally comprises a bearing point 14. In the bearing point 14, the latching element 8 rolls in the rotary latch 7. The rotary latch also has an extended contact surface 15 which, arranged in the bearing area 13, forms a prelatch 15 for the pawl 9. For engagement in the prelatch 15, the pawl 9 has a latching surface 16.

FIG. 1 shows the open position of the locking mechanism. If the motor vehicle lock 1 or the vehicle door 3 is now moved, a catch arm 17 engages with the lock holder 6 and pivots the rotary latch 7 counterclockwise. The lock holder 6 and the rotary latch 7 interact in that the lock holder 6 enters the entry area 18 of the motor vehicle lock 1. The rotary movement of the rotary latch 7 around the bearing point 5 causes the pawl 9 to engage with the latching surface 16 or the prelatch 15 when the locking mechanism 2 is closed.

Figure 2:
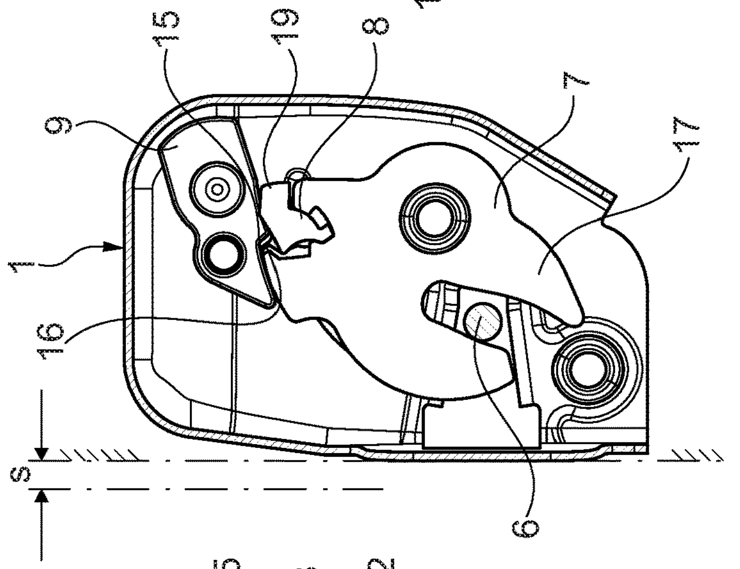

The prelatching position of the motor vehicle lock 1 is shown in FIG. 2. It can be seen that the lock holder 6 has moved the rotary latch 7 counterclockwise, and the pawl 9 rests with the latching surface 16 against the prelatch 15. In the prelatching position as shown in FIG. 2, a door gap S or a gap S is established which, due to the close prelatch, is a small gap with respect to a main latch 19 on the latching element 8. The design of the prelatch 15 according to the invention in the immediate vicinity of the main latch 19 and in the bearing area 13 of the latching element 9 makes it possible to set such a small door gap or such a small gap dimension in the movable component that the motor vehicle lock 1 can be operated with a power latch.

If the rotary latch 7 is now moved from the prelatching position shown in FIG. 2 to the main latching position, for example by means of a closing drive, the latching element 8 engages with the pawl 9. The main latching position is shown in FIG. 3.

Figure 3:
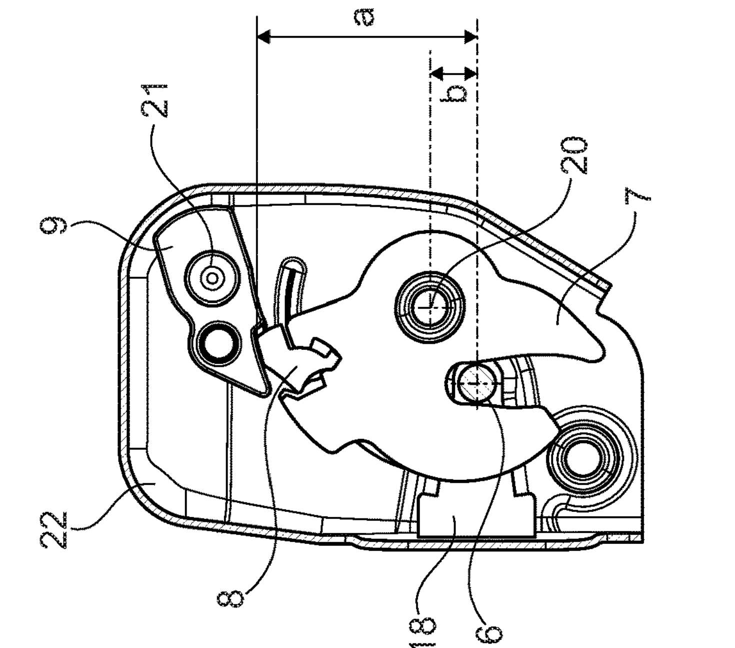
FIG. 3 shows the locking mechanism according to the invention according to the above figures in a main latching position.

As can be clearly seen in FIG. 3, the axis of rotation 20 of the rotary latch 7 as well as the axis of rotation 21 of the locking pawl 9 are located behind the entry area 18 of the lock case 22. The axes of rotation 20, 21 are also located above the entry area 18, which results in the advantages in the motor vehicle lock 1 described above. In addition, the arrangement of the locking components 7, 8, 9 according to the invention makes it possible to set a favorable locking part ratio in the motor vehicle lock 1. The locking part ratio is calculated from the distances a, b and describes the ratio a:b as the ratio of the torques in the locking mechanism 2. The locking part ratio describes the distances or the length ratio between the levers and should be set as large as possible. The larger the locking part ratio, the lower the exerted force required to disengage the locking mechanism. A favorable locking part ratio in combination with the latching element 8 in the locking mechanism 2 enables the motor vehicle lock 1 to be opened easily and accordingly electrically at any time.

LIST OF REFERENCE NUMBERS

1 Motor vehicle lock
2 Locking mechanism
3 Body, vehicle door
4,5 Threaded bushing
6 Lock holder
7 Rotary latch
8 Latching element
9 Pawl
10 Pin
13 Surface of the rotary latch
11, 12 Bearing area
13 Bearing point
14 Contact surface, prelatch
15, 16 Latching surface
17 Catch arm
18 Entry area
19 Main latch
20, 21 Rotational axis
22 Lock case
S Door gap
a, b Distance, lever length

The invention claimed is:

1. A lock for a motor vehicle, the lock comprising:

a locking mechanism with a rotary latch and a pawl, wherein the rotary latch is latched by the pawl at least in a main latching position, and a latching element, which is located in an engagement area between the rotary latch and the pawl and is arranged on the rotary latch, wherein the latching element is pivotably accommodated in the rotary latch such that the latching element operates with a pivoting movement between the rotary latch and the pawl to bring the pawl into engagement with the rotary latch when the rotary latch is in the main latching position, wherein the pawl is brought into direct engagement with the rotary latch and the latching element in a prelatching position of the rotary latch, further comprising a lock plate having an entry area for receiving a lock holder, wherein the entry area extends in a first direction from an open end of the entry area to a closed end of the entry area, and wherein when the rotary latch is in the main latching position and engages with the lock holder received in the entry area of the lock plate, the lock holder is on a first side of a plane extending perpendicular to the first direction and an axis of rotation of the rotary latch and an axis of rotation of the pawl are arranged on a second side of the plane opposite the first side.

2. The lock for a motor vehicle according to claim 1, wherein in the main latching position of the rotary latch, the pawl is brought into engagement with the rotary latch in a bearing area of the latching element in which the latching element comes into contact with the rotary latch.

3. The lock for a motor vehicle according to claim 2, wherein the bearing area is an extended contact surface of a bearing point for the latching element.

4. The lock for a motor vehicle according to claim 1, wherein the axis of rotation of the rotary latch is formed as a fastening point for the motor vehicle lock.

5. The lock for a motor vehicle according to claim 1, wherein at least one of the rotary latch, the latching element, the pawl, a pawl axle, or a rotary latch axle includes a metallic material.

6. The lock for a motor vehicle according to claim 5, wherein the metallic material includes steel.

7. The lock for a motor vehicle according to claim 5, wherein the at least one of the rotary latch, the latching element, the pawl, the pawl axle, or the rotary latch axle includes a plastic coating over the metallic material.

8. The lock for a motor vehicle according to claim 1, wherein the pawl is arranged in a plane with the rotary latch.

9. The lock for a motor vehicle according to claim 1, wherein the pawl is spring biased in a direction of the rotary latch, and the latching element is spring biased against a surface of the rotary latch.

10. The lock for a motor vehicle according to claim 1, wherein in the prelatching position, the pawl directly rests against a prelatching surface of the rotary latch, and in the main latching position, the pawl engages a main latching surface of the latching element.

* * * * *